United States Patent

Fultz et al.

[11] Patent Number: 5,929,156
[45] Date of Patent: *Jul. 27, 1999

[54] SILICA PRODUCT FOR USE IN ELASTOMERS

[75] Inventors: William C. Fultz, Rising Sun, Md.; Michel J. Martin, Plainsboro, N.J.; Mark A. Beavers, Delta, Pa.

[73] Assignee: J.M. Huber Corporation, Edison, N.J.

[*] Notice: This patent is subject to a terminal disclaimer.

[21] Appl. No.: 08/850,813

[22] Filed: May 2, 1997

[51] Int. Cl.[6] .................................................. C08K 3/00
[52] U.S. Cl. ........................... 524/492; 423/335; 524/493
[58] Field of Search ................................... 524/492, 493; 423/335

[56] References Cited

U.S. PATENT DOCUMENTS

| | | | |
|---|---|---|---|
| 3,977,893 | 8/1976 | Wason | 106/288 B |
| 4,127,641 | 11/1978 | Aldcroft et al. | 423/339 |
| 4,179,431 | 12/1979 | Kilian et al. | 260/42.37 |
| 4,251,281 | 2/1981 | Macurat et al. | 106/288 B |
| 4,279,766 | 7/1981 | Joubert et al. | 252/174.25 |
| 4,422,880 | 12/1983 | Wason et al. | 106/288 B |
| 4,590,052 | 5/1986 | Chevallier et al. | 423/335 |
| 4,708,859 | 11/1987 | Chevallier | 423/339 |
| 4,842,838 | 6/1989 | Chevallier | 423/339 |
| 4,874,594 | 10/1989 | Chevallier | 423/335 |
| 5,089,554 | 2/1992 | Bomo et al. | 524/493 |
| 5,124,143 | 6/1992 | Muhlemann et al. | 424/49 |
| 5,227,425 | 7/1993 | Rauline | 524/493 |
| 5,342,598 | 8/1994 | Persello | 423/339 |
| 5,395,605 | 3/1995 | Billion et al. | 423/339 |
| 5,403,570 | 4/1995 | Chevallier et al. | 423/339 |
| 5,547,502 | 8/1996 | Chevallier et al. | 106/287 |
| 5,580,919 | 12/1996 | Agostini et al. | 524/430 |
| 5,587,416 | 12/1996 | Chevallier et al. | 524/492 |
| 5,605,569 | 2/1997 | Boyer et al. | 106/482 |
| 5,635,214 | 6/1997 | Ponchon et al. | 424/489 |
| 5,674,932 | 10/1997 | Agostini et al. | 524/430 |
| 5,723,529 | 3/1998 | Bernard et al. | 524/492 |

FOREIGN PATENT DOCUMENTS

| | | |
|---|---|---|
| 602604 | 8/1960 | Canada . |
| 0 407 262 | 1/1991 | European Pat. Off. . |
| 0 647 591 | 4/1995 | European Pat. Off. . |
| 710015 | 6/1954 | United Kingdom . |
| 719918 | 12/1954 | United Kingdom . |
| WO 95/09127 | 4/1995 | WIPO . |
| WO 95/09128 | 4/1995 | WIPO . |

*Primary Examiner*—Edward J. Cain
*Attorney, Agent, or Firm*—Robert A. Koons, Jr.; Russell G. Lindenfeldar; Pepper Hamilton LLP

[57] ABSTRACT

A precipitated amorphous silica product particularly useful as a highly dispersible filler to elastomeric compounds, especially rubber passenger tire tread formulations. The invention has a CTAB specific surface area of about 10 $m^2/g$ to less than 140 $m^2/g$; a multi-point BET surface area of about 50–261 $m^2/g$; a 5% pH value of about 5.0–8.5; a DBP oil absorption of about 160–310 $cm^3/100$ g; a linseed oil absorption of about 150–300 $cm^3/100$ g; a projected surface area of no greater than about 4000 $nm^2$; and a pore volume ratio of pores ranging from 175 to 275 Å in diameter to all pores less than 400 Å in diameter of about 10% to less than 50%.

37 Claims, No Drawings

SILICA PRODUCT FOR USE IN ELASTOMERS

BACKGROUND OF THE INVENTION

1. Field of the Invention

The invention relates to a novel precipitated silica product and a process for making the same. More specifically, the invention relates to an amorphous precipitated silica product which is useful as an additive in elastomeric formulations used for formed products, particularly rubber passenger tire treads.

2. Description of the Related Art

As disclosed in Kirk-Othmer, *Encyclopedia of Chemical Technology*, Third Edition, Volume 20, John Wiley Sons, New York, p. 779 (1982), precipitated silica product is used, inter alia, as a filler for rubber. In general, fillers are used as reinforcing agents to improve the mechanical properties of rubber and other elastomers.

Any filler used in elastomeric applications should be easy to handle and easy to formulate into elastomeric mixtures. In powder form, silica products can be difficult to handle because of poor flow and high dust generation. Also, the low bulk density of powder silica products impedes incorporation into elastomers.

While formed silica products can obviate these shortcomings to a certain extent, dispersion of the formed silica product in the elastomer can be difficult, and the degree of reinforcement achieved may be less than would be attained with a powdered silica product. Optimum reinforcing properties are generally achieved when the silica product is homogeneously dispersed throughout the elastomer matrix in a finely-divided state. Therefore, an ideal formed silica product should readily combine with the elastomer matrix and thereafter deagglomerate or disintegrate into a fine powder in the matrix, said fine powder being readily dispersible to a homogeneous state.

In addition, a silica filler should minimize the need for expensive coupling agents in the rubber formulation. Coupling agents are typically tri-alkoxy silanes possessing an amino, mercapto, polysulfidic or other functional group, and are used to reduce heat buildup/hysteresis and to enhance the mechanical improvements provided by the silica filler.

In the case of rubber formulations for the tire industry, and in particular solution styrene-butadiene rubber (s-SBR) for passenger tire treads, there are several desirable yet contradictory rubber tread properties which are strongly affected by the physical properties of the filler employed. The ability of the tread to adhere to the ground whether the surface is dry, wet, snow-covered or ice-covered is very important, and there are known silica fillers which can provide good tire traction under various conditions. However, known traction-enhancing silica fillers do not simultaneously provide the reduced rolling resistance, low tread wear rate and limited structural deformation also demanded of tires. Similarly, silica fillers which improve the rolling characteristics and durability of tire treads have historically done so at the expense of traction, and have typically required high loadings of expensive coupling agents to boost traction. Moreover, known highly-dispersible silica fillers for rubber fail to enhance the processability of rubber.

Consequently, there has been much effort in the silica filler/passenger tire tread formulation art to develop a highly-dispersible silica filler which provides an optimized combination of these contradictory tread properties while enhancing processability. See, e.g., U.S. Pat. Nos. 5,089, 554, 5,227,425 and 5,403,570, as well as International Application Nos. WO 95/09127 and WO 95/09128. However, these efforts have at best resulted in unsatisfactory compromises between highly desirable characteristics. Thus, there remains a long-felt need in the art for a highly-dispersible silica filler which, when incorporated into rubber compounds, particularly rubber blends of solution SBR with one or more additional polymers, provides enhanced processability, low rolling resistance, high durability, high all-weather traction and reduced coupling agent demand for passenger tire treads fashioned therefrom or other rubber/elastomer dynamic applications.

OBJECTS OF THE INVENTION

Accordingly, it is an object of the invention to provide a highly-dispersible precipitated amorphous silica product suitable as a filler for elastomeric compounds.

It is another object of the invention to provide an improved highly-dispersible precipitated amorphous silica filler for passenger tire tread applications.

Other objects will become apparent from the description of the invention which follows.

SUMMARY OF THE INVENTION

Briefly, the invention is a precipitated amorphous silica product having a CTAB specific surface area of about 10 $m^2/g$ to less than 140 $m^2/g$, preferably about 10–110 $m^2/g$, and more preferably about 10 $m^2/g$ to less than 100 $m^2/g$; a multi-point BET surface area of about 50–261 $m^2/g$; a 5% pH value of about 5.0–8.5; a DBP oil absorption of about 160–310 $cm^3/100$ g; a linseed oil absorption of about 150–300 $cm^3/100$ g; a projected surface area of no greater than about 4000 $nm^2$, preferably no greater than about 3500 $nm^2$; and a pore volume ratio of pores ranging from 175 to 275 Å in diameter to all pores less than 400 Å in diameter of about 10% to less than 50%.

Preferably, the precipitated amorphous silica product of the invention is subjected to a forming process such as granulation, pelletization, nozzle spray drying and the like. When formed, the invention preferably has a bulk (pour) density of about 0.16–0.30 g/mL, more preferably about 0.16–0.27 g/mL, and a minus 200 mesh content of no greater than about 20 wt %, more preferably no greater than about 10 wt %.

The method of the invention involves adding an acid at a substantially constant rate to a water and alkaline metal silicate mixture, the mixture being at a temperature of about 60–90° C., and the silicate having a mole ratio of about 2.4–3.3. When the pH of the reaction mixture reaches about 10.0–6.5, preferably about 7.8–7.5, more silicate is added together with the acid. The reaction mixture pH is maintained at about 10.0–6.5, preferably about 7.7–7.3 by adjusting the acid addition rate. The silicate addition is discontinued after about 0–60 minutes, preferably about 30 minutes, while the acid addition continues until a reaction mixture pH of about 4.5–6.5, preferably about 5.1–5.5 is achieved. The reaction mixture digests for about 0–60 minutes at a temperature of about 60–99° C., after which the pH is readjusted with acid to about 4.5–6.5, preferably to about 5.1–5.5. An electrolyte, preferably sodium sulfate, may be added at any point in the synthesis through digestion. The silica slurry is filtered from the reaction mixture and washed. Washing is preferably performed until the sodium sulfate content of the washed silica product is no greater than about 4.5%. Preferably, the pH of the washed silica slurry is readjusted to about 6.0–7.0 with acid. The washed silica slurry is then dried, preferably to an $H_2O$ content of no greater than about 8%.

The invention encompasses an elastomeric formulation containing the precipitated amorphous silica product or formed silica product described herein. The elastomer is preferably s-SBR, more preferably s-SBR and at least one other polymer. The other polymer is preferably a diene. The invention also encompasses an elastomer formulation which may be used in a tire tread containing the precipitated amorphous silica product or formed silica product described herein.

DETAILED DESCRIPTION OF THE INVENTION

We have discovered a highly-dispersible silica product which, when incorporated into rubber compounds as a filler in passenger tire tread production, provides a combination of enhanced processability, rolling resistance, durability and traction to the tread product at levels unknown in the prior art. More particularly, the invention provides a unique combination of advantages which were previously considered mutually exclusive; i.e., excellent rubber processing, low rolling resistance, good wet traction, good ice traction, enhanced rubber extrusion, minimal coupling agent demand, good abrasion resistance, and high tensile and modulus. When formed, the invention is also easy to handle and produces minimal dust.

The inventive silica product possesses a unique combination of several physical properties, specifically a CTAB specific surface area of about 10 $m^2/g$ to less than 140 $m^2/g$, preferably about 10–110 $m^2/g$, and more preferably about 10 $m^2/g$ to less than 100 $m^2/g$; a multi-point BET surface area of about 50–261 $m^2/g$; a 5% pH value of about 5.0–8.5; a DBP oil absorption of about 160–310 $cm^3/100$ g; a linseed oil absorption of about 150–300 $cm^3/100$ g; a projected surface area of no greater than about 4000 $nm^{2;}$ preferably no greater than about 3500 $nm^{2;}$ and a pore volume ratio of pores ranging from 175 to 275 Å in diameter to all pores less than 400 Å in diameter of about 10% to less than 50%.

When formed, the invention preferably exhibits a bulk (pour) density of about 0.16–0.30 g/mL, more preferably 0.16–0.27 g/mL, and preferably a minus 200 mesh content of no greater than about 20 wt %, more preferably no greater than about 10 wt %. Granulation, pelletization, and/or other known forming means can be used. The formed silica product of the invention generates less dust, is easy to handle and will readily combine with elastomeric formulations.

It is well known that a single physical characteristic, such as surface area or particle size, does little to describe a silica product or to predict its behavior in a specific application. The mechanisms which govern how a particular silica product performs in a given end-use can be extraordinarily complex and are often not well understood; thus, linking one or even a few conventionally-measured silica product physical properties to particular end-use performance characteristics is extremely difficult and potentially misleading. What we have discovered is that the invention quite unexpectedly performs far better in passenger tire tread applications than known precipitated amorphous silica products having some similar conventionally-measured physical properties, as clearly demonstrated by the tests which we have performed and describe herein. We do not rule out the possibility that novel silica product measuring techniques may be developed which could reveal additional physical distinctions between the invention and the prior art to further explain the significant and surprising performance advantages provided by the invention.

The method of the invention involves adding acid to a mixture of water and an alkaline metal silicate at about 60–90° C. The water and/or silicate can be heated separately or after they are combined. The alkaline metal silicate used is not particularly limited, and can include meta- and di-silicates of any alkali metal or alkaline earth metal. The silicate preferably has a mole ratio of about 2.4–3.3, and is preferably added as an aqueous solution having a silicate concentration of about 10.0–30.0%. An electrolyte may also be added to the reaction medium or combined with one or more of the reactants before or as they are added to the reaction medium. An electrolyte may also be added anytime during the synthesis process through digestion, preferably in the first half of the reaction. Any known electrolyte may be used, with sodium sulfate being preferred.

The acid addition is conducted at a substantially constant rate. The acid is preferably added as a solution of about 5.0–30.0%. Sulfuric acid is preferably used, but other acids such as $H_3PO_4$, $HNO_3$, HCl, $HCO_2H$, $CH_3CO_2H$ and carbonic acid may be successfully employed.

When the pH of the reaction mixture reaches about 10.0–6.5, preferably 7.8–7.5, more silicate is added to the reaction mixture while the acid addition continues. Precipitation occurs during the simultaneous addition, and the precipitation pH is maintained at about 10.0–6.5, preferably at about 7.7–7.3 by adjusting the acid addition rate. The silicate addition is discontinued after about 0–60 minutes, while the acid addition continues until a reaction mixture pH of about 4.5–6.5, preferably about 5.1–5.5 is achieved.

After terminating the acid addition, the reaction mixture is allowed to digest for about 0–60 minutes at a temperature of about 60–99° C. An electrolyte, such as sodium sulfate, may be added at any point in synthesis through the digestion step. After digestion, the reaction mixture pH is readjusted with acid to about 4.5–6.5, preferably to about 5.1–5.5.

The product silica slurry is then filtered from the reaction mixture and washed. Filtration as used herein includes any separation means known in the art, such as rotary filtration, press filtration, pressure filtration, plate and frame filtration, and others. The washing is performed preferably until the sodium sulfate content is less than about 4.5%. Before drying, the pH of the washed silica slurry is preferably readjusted to about 6.0–7.0 with acid.

The washed silica slurry is then dried to a silica product. Drying can be accomplished by wheel spray drying, nozzle spray drying, flash drying, rotary drying, or any other drying means known in the art. Preferably, drying is performed until the moisture content of the silica product is about 8% or less.

The silica product can then, if desired, be placed in a low dust/readily dispersible form by any forming process such as granulation, pelletization, and/or other known forming means. A granulation process is preferred where the silica product is compressed into compacted bodies, the bodies then being broken into smaller particles. The fme fraction of the smaller particles is then recovered and mixed with more silica product, and that mixture is compressed into denser compacted bodies. The denser compacted bodies are then broken-up and screened to the desired size to form the granulated product. A vacuum may be applied during various points in the process to aid in the densification. Spray dried silica can be milled prior to granulation. These forming procedures can be accomplished with or without the aid of other agents, such as water, corn syrup, etc.

As demonstrated below, elastomeric compounds containing the inventive silica product, particularly tire tread compounds, exhibit improved processability and a combination of performance characteristics unknown in prior art elastomeric compounds. The elastomeric compounds preferably contain s-SBR as the elastomer, and may contain other polymers, preferably dienes. The elastomeric compounds can be used in any dynamic application, including but not limited to tire tread and motor mount applications.

The invention will now be described through illustrative examples. The examples are not intended to limit the scope of the invention defined in the appended claims.

EXAMPLE 1

A precipitated amorphous silica product in accordance with the invention was produced by combining 260 L of water and 200 L of 24.7% sodium silicate (3.3 silicate mole ratio, 82.9% excess silicate; excess silicate=100×volume of silicate initially present in the reaction medium÷total volume of silicate used in the reaction) in a reactor and heating the reaction medium to 82° C. To the heated reaction medium was added 9.5 kg of anhydrous sodium sulfate. Thereafter, sulfuric acid (7.4%) at 33° C. was introduced to the heated reaction medium at 4.5 L/min. When the reaction medium pH reached 7.5, the acid addition rate was slowed to 1.81 L/min, and an addition of 24.7% sodium silicate (3.3 mole ratio) at 1.38 L/min commenced. During the simultaneous addition, the precipitation pH was maintained at 7.5 by adjusting the acid addition rate. The silicate addition was terminated after 30 minutes, but the acid addition continued thereafter at 1.81 L/min until a reaction mixture pH of 5.1 was achieved. The reaction mixture was then allowed to digest at 82° C. for 10 minutes, after which the pH was readjusted to 5.1 with more acid.

Precipitated silica slurry was rotary-filtered from the reaction mixture and washed with water until the sodium sulfate content was reduced. Thereafter, the silica slurry was spray dried.

Physical characteristics of the final product were evaluated as follows, and are summarized in Table 1.

Average Particle Size (APS)

Particle size was determined using a Leeds and Northrup Microtrac II apparatus. During operation, a laser beam is projected through a transparent cell which contains a stream of moving particles suspended in a liquid. Light rays which strike the particles are scattered through angles which are inversely proportional to their sizes. The photodetector array measures the quantity of light at several predetermined angles. Electrical signals proportional to the measured light flux values are then processed by a microcomputer system to form a multi-channel histogram of the particle size distribution.

Multipoint BET

A Gemini III 2375 Surface Area Analyzer (Micromeritics Corporation) was used to determine the surface area of solid materials. During operation, an analysis gas (nitrogen) is metered simultaneously into a tube containing the sample and into a (blank) balance tube. The internal volume and the temperature surrounding both tubes are maintained at identical conditions, with the only difference being the presence of sample in the sample tube.

The sample and balance tubes are immersed in a single liquid nitrogen bath which maintains isothermal conditions for both tubes. Metering of the analysis gas is delivered to both the balance and sample tubes through separate servo valves. A differential pressure transducer measures the pressure imbalance between both tubes, which is caused by the adsorption of the gas onto the sample. As the sample adsorbs analysis gas, the servo valve maintains the pressure balance between the two tubes by admitting more gas into the sample tube. The end result is that the Gemini maintains a constant pressure of the analysis gas over the sample while varying the rate of analysis gas delivery to match the rate at which the sample can adsorb the gas.

Bulk Fines and Pellet Distribution of Compacted Products

Bulk Fines and Pellet Distribution of Compacted Products were determined by weighing fractions retained on or passing through 8 inch diameter stainless steel U.S. Sieves number 50 and 200 mesh, opening sizes 297 $\mu$m and 74 $\mu$m, respectively.

10.0±0.1 g of sample is placed on top of a stacked set of screens. The screens are covered and shaken for 5 minutes on a Portable Sieve Shaker, C-E Tyler Model RX-24, (W. S. Tyler Inc.). The percentage of the sample passing or retained on the mesh sizes of interest is determined by weight.

Granule Bulk Density (Loose or Pour Density of Compacted Product)

A funnel with an opening which can be closed is placed at a fixed height of 3 inches directly above the mouth of a standard pint cup. The granules are loaded into the closed funnel. The funnel is opened and the granules are free to fall into and overflow the cup. The granules are scraped off level with the top of the cup using the flat edge of a spatula. The full cup is weighed and the weight of the granules (in grams to the nearest 0.1 gram) is determined by subtracting the weight of the empty cup. The weight of the granules is divided by the standard volume (in mL) of the cup to give the bulk density in g/mL.

Pore Volume Method

Pore volume (mercury pore volume) is determined using an Autopore II 9220 Porosimeter (Micromeritics Corporation). This instrument measures the void volume and pore size distribution of various materials. Mercury is forced into the voids as a function of pressure and the volume of the mercury intruded per gram of sample is calculated at each pressure setting. Total pore volume expressed herein represent the cumulative volume of mercury intruded at pressures from vacuum to 60,000 psi. Increments in volume ($cm^3$/g) at each pressure setting are plotted against the pore radius corresponding to the pressure setting increments. The peak in the intruded volume versus pore radius curve corresponds to the mode in the pore size distribution and identifies the most common pore size in the sample.

Oil Absorption

Oil absorption, using linseed or DBP (dibutylphthalate) oil, was determined by the rub-out method. The method involves mixing linseed or DBP oil with a silica product by rubbing with a spatula on a smooth surface until a stiff putty-like paste is formed. By measuring the quantity of oil required to saturate the silica product, i.e. the quantity of oil required to form a silica/oil paste mixture which curls when spread out, the oil absorption of the silica product is determined. The oil absorption value is calculated as follows:

Oil absorption=($cm^3$ oil absorbed×100)÷weight of silica product, grams=$cm^3$ oil/100 grams silica product CTAB Surface Area The external surface area of silica product was determined by adsorption of CTAB (cetyltrimethylammonium bromide) on the silica product surface, the excess CTAB being separated by centrifugation and determined by titration with sodium lauryl sulfate using a surfactant electrode. The external surface area of the silica product is calculated from the quantity of CTAB adsorbed (analysis of CTAB before and after adsorption).

Specifically, about 0.5 g of silica product is placed in a 250-mL beaker with 100.00 mL CTAB solution (5.5 g/L).

The solution is mixed on an electric stir plate for 1 hour then centrifuged for 30 minutes at 10,000 rpm. 1 mL of 10% Triton X-100 is added to 5 mL of the clear supernatant in a 100-mL beaker. The pH is adjusted to 3.0–3.5 with 0.1 N HCl and titrate with 0.0100 M sodium lauryl sulfate using a surfactant electrode (Brinkmann SUR15O1-DL) to determine the endpoint.

Projected Surface Area

The average projected area of the silica product is determined by the following method. 150 mg of silica product are introduced into a beaker containing a mixture of 10 mL of water and 20 mL of isopropyl alcohol; the mixture is agitated with ultrasonics (L&R-PC5 Ultrasonic Cleaning Systems) for 60 minutes, while maintaining temperature below 30° C. After which, while continuing the ultrasonic agitation, 10 microliters of the contents of the beaker are removed by a micropipet and placed on three 200-mesh copper grids which had been carbon Formvar coated. Excess liquid is removed by wicking (touching a sharp corner of filter paper to the drop) after allowing the drop to stand for 20 seconds, so as to prevent reagglomeration of the particles. The average projected area of 1000 aggregates is determined by image analysis.

For image analysis, the TEM micrographs were placed on the epidiascope attachment of the image analyzing computer. Using the area function, the area of all measurable particles in the micrographs was measured. Only particles whose entire feature lay in the micrographs and whose boundaries were clearly defined were analyzed. In this case, a particle was defined as an aggregate of silica particles. Various size ranges were selected according to the available ranges of the image analyzer. The data were obtained as the number of particles within each size range.

5% pH

A 5% pH is determined by weighing 5.0 grams of silica product into a 250-mL beaker, adding 95 mL deionized or distilled water, mixing for 7 minutes on a magnetic stir plate, and measuring the pH with a pH meter which has been standardized with two buffer solutions bracketing the expected pH range.

Percent Sodium Sulfate

A 13.3 gram sample of silica product is weighed out and added to 240 mL of distilled water. The slurry is mixed for 5 minutes on a Hamilton Beach mixer. The slurry is transferred to a 250 mL graduate and distilled water is added to make 250 mL of slurry. Sample is mixed and the temperature of the slurry is determined. The conductivity of the solution is measured using a Solu-Bridge with the temperature compensator properly adjusted. The percent sodium sulfate is determined from a standard calibrated chart.

Percent Moisture

A sample of about 2.0 grams is weighed in a pre-weighed weighing dish to the nearest 0.0001 gram. The sample is placed in an oven for 2 hours at 105° C., then removed and cooled in a desiccator. The cooled sample is weighed and the weight loss is divided by the original weight of sample and multiplied by 100, resulting in the percent moisture.

EXAMPLE 2

A precipitated amorphous silica product in accordance with the invention was produced by combining 235 L of water and 166 L of 30.0% sodium silicate (2.5 silicate mole ratio, 84.7% excess silicate) in a reactor and heating the reaction medium to 87° C. Sulfuric acid (11.4%) at 33° C. was introduced to the heated reaction medium at 2.7 L/min. When the reaction medium pH reached 7.5, the acid addition rate was slowed to 1.4 L/min, and an addition of 30.0% sodium silicate (2.5 mole ratio) at 1.0 L/min commenced. During the simultaneous addition, the precipitation pH was maintained at 7.5 by adjusting the acid addition rate. The silicate addition was terminated after 30 minutes, but the acid addition continued thereafter at 1.3 L/min until a reaction mixture pH of 5.5 was achieved. The reaction mixture was then allowed to digest at 87° C. for 10 minutes, after which the pH was readjusted to 5.5 with more acid.

Precipitated silica slurry was rotary-filtered from the reaction mixture and washed with water until the sodium sulfate content was reduced. The pH of the washed silica slurry was adjusted to 6.5 with more acid, and thereafter the silica slurry was spray dried.

The physical properties of the final product were measured as described in Example 1, and the results are summarized in Table 1.

EXAMPLE 3

A precipitated amorphous silica product in accordance with the invention was produced by combining 2568 gal. of 1.8% sodium sulfate and 1707 gal. of 24.7% sodium silicate (3.3 silicate mole ratio, 76.4% excess silicate) in a reactor and heating the reaction medium to 180° F. Sulfuric acid (7.4%) at 90° F. was then introduced into the heated reaction medium at 34.0 gal./min. When the reaction medium pH reached 7.8, the acid addition rate was slowed to 17.6 gal./min, and an addition of 24.7% sodium silicate (3.3 mole ratio) at 11.9 gal./min commenced. During the simultaneous addition, the precipitation pH was maintained at 7.3–7.7 by adjusting the acid addition rate. The silicate addition was terminated after 30 minutes, but the acid addition continued thereafter at 17.6 gal./min until a reaction mixture pH of 5.5 was achieved. The reaction mixture was then allowed to digest at 180° F. for 10 minutes, after which the pH was readjusted to 5.5 with more acid.

Precipitated silica slurry was rotary-filtered from the reaction mixture and washed with water until the sodium sulfate content was reduced. Thereafter, the silica slurry was spray dried.

The physical properties of the final product were measured as described in Example 1, and the results are summarized in Table 1.

EXAMPLE 4

A silica product was prepared as described in Example 2, then granulated. Granulation was accomplished by compacting the silica product between pocketed tandem rolls at 700 psi, then attriting the compacted silica product into smaller particles. The fine fraction (less than 16 mesh) of the smaller particles was recycled into the tandem rolls along with additional silica product to produce a denser compacted silica product, which was then attrited and screened to produce a granulated silica product having a granule bulk density of 0.281 g/mL and a size distribution of 83.3% +50 mesh and 5.4% −200 mesh. Prior to and during compaction, vacuum was applied to the granulation system to deaerate the silica feed.

The physical properties of the final product were measured as described in Example 1, and the results are summarized in Table 1.

EXAMPLE 5

A precipitated amorphous silica product in accordance with the invention was produced by combining 2732 gal. of water and 1749 gal. of 30% sodium silicate (2.5 silicate mole ratio, 83.6% excess silicate) in a reactor and heating the reaction medium to 87° C. Sulfuric acid (11.4%) at 33° C. was then introduced into the heated reaction medium at 30.2 gal./min. When the reaction medium pH reached 7.5, the acid addition rate was slowed to 15.6 gal./min, and an addition of 30% sodium silicate (2.5 mole ratio) at 11.4 gal./min commenced. During the simultaneous addition, the precipitation pH was maintained at 7.5 by adjusting the acid addition rate. The silicate addition was terminated after 30 minutes, but the acid addition continued thereafter at 14.5 gal./min until a reaction mixture pH of 5.5 was achieved. The reaction mixture was then allowed to digest at 87° C. for 10 minutes, after which the pH was readjusted to 5.5 with more acid.

Precipitated silica slurry was rotary-filtered from the reaction mixture and washed with water until the sodium sulfate content was reduced. Thereafter, the silica slurry was spray dried, and the spray dried silica product was granulated as described in Example 4 except that a tandem rolls of 200 psi was used, and no vacuum was applied to the system.

The physical properties of the final product were measured as described in Example 1, and the results are summarized in Table 1.

EXAMPLE 6

A precipitated amorphous silica product in accordance with the invention was produced by combining 3041 gal. of water and 1692 gal. of 30% sodium silicate (2.5 silicate mole ratio, 83.2% excess silicate) in a reactor and heating the reaction medium to 78° C. Sulfuric acid (11.4%) at 33° C. was then introduced into the heated reaction medium at 29.3 gal./min. When the reaction medium pH reached 7.5, the acid addition rate was slowed to 15.6 gal./min, and an addition of 30% sodium silicate (2.5 mole ratio) at 11.4 gal./min commenced. During the simultaneous addition, the precipitation pH was maintained at 7.5 by adjusting the acid addition rate. The silicate addition was terminated after 30 minutes, but the acid addition continued thereafter at 15.6 gal./min until a reaction mixture pH of 5.3 was achieved. The reaction mixture was then allowed to digest at 78° C. for 10 minutes, after which the pH was readjusted to 5.3 with more acid.

Precipitated silica slurry was rotary-filtered from the reaction mixture and washed with water until the sodium sulfate content was reduced. The pH of the washed silica slurry was adjusted to 6.5 with more acid as needed, and thereafter the silica slurry was spray dried.

The physical properties of the final product were measured as described in Example 1, and the results are summarized in Table 1.

EXAMPLE 7

A silica product was prepared as described in Example 6, then granulated as described in Example 4, except a tandem roll pressure of 620 psi was used, and no vacuum was applied to the system.

The physical properties of the final product were measured as described in Example 1, and the results are summarized in Table 1.

In addition to the above-described Examples, the physical properties of three commercially-available precipitated amorphous silica products were tested as described in Example 1, and the results are summarized in Table 2. Comparative Example 1 is Zeofree® 80 (J.M. Huber Corporation), Comparative Example 2 is Zeosil® 1165MPND (Rhone-Poulenc Chimie), and Comparative Example 3 is Zeopol® 8741 (J.M. Huber Corporation).

TABLE 1

| Physical Characteristics | Example 1 | Example 2 | Example 3 | Example 4 | Example 5 | Example 6 | Example 7 |
|---|---|---|---|---|---|---|---|
| Form | Powder | Powder | Powder | Granules | Granules | Powder | Granules |
| Specific Surface Area by CTAB, $m^2/g$ | 87 | 55 | 114 | 61 | 76 | 93 | 95 |
| Specific Surface Area by BET, $m^2/g$ | 133 | 75 | 150 | 83 | 91 | 132 | 187 |
| 5% pH | 6.9 | 7.0 | 7.0 | 7.0 | 7.4 | 6.9 | 6.9 |
| Mercury Intrusion Peak Diameter Location, Å | 640 | 1020 | 360 | 640 | 790 | 610 | 500 |
| Mercury Intrusion Total Pore Volume, $cm^3/g$ | 4.2676 | 3.7618 | 4.5191 | 1.8637 | 5.5669 | 4.8330 | 2.6777 |
| Mercury Intrusion Pore Volume Ratio V2/V1)*100 | 20.4 | 21.2 | 28.6 | 23.8 | 19.2 | 23.4 | 23.6 |
| Granule Bulk Density g/mL | **** | **** | **** | 0.281 | 0.197 | **** | 0.225 |
| % $Na_2SO_4$ | 1.3 | 1.2 | 1.5 | 1.3 | 2.6 | 1.3 | 1.8 |
| APS MicroTrac for Powders, microns | 54.2 | 28.6 | 66.6 | **** | **** | 62.5 | **** |
| Projected Surface Area, $nm^2$ | 3098 | **** | **** | **** | **** | **** | **** |
| % Retained on 50 Mesh for Granules | **** | **** | **** | 83.3 | 81.2 | **** | 91.8 |
| % Thru 200 Mesh for Granules | **** | **** | **** | 5.4 | 5.6 | **** | 3.4 |
| % Free Moisture | 5.3 | 5.0 | 4.7 | 5.7 | 6.8 | 5.9 | 5.3 |
| Linseed Oil Absorption, $cm^3/100$ gram | 204 | 218 | 233 | 203 | 169 | 210 | 177 |

TABLE 1-continued

| Physical Characteristics | Example 1 | Example 2 | Example 3 | Example 4 | Example 5 | Example 6 | Example 7 |
|---|---|---|---|---|---|---|---|
| DBP Oil Absorption, cm³/100 gram | 210 | 248 | 248 | 229 | 202 | 242 | 205 |

TABLE 2

| Physical Characteristics | Comparative Example 1 | Comparative Example 2 | Comparative Example 3 |
|---|---|---|---|
| Trade name | Zeofree ® 80 | Zeosil ® 1165 | Zeopol ® 8741 |
| Form | Powder | Micro-pearls | Powder |
| Specific Surface Area by CTAB m²/g | 55 | 153 | 143 |
| Specific Surface Area by BET m²/g | 85 | 164 | 183 |
| 5% pH | 7.0 | 6.4 | 7.2 |
| Mercury Intrusion Peak Diameter Location, Å | 700 | 250 | 285 |
| Mercury Intrusion Total Pore Volume, cm³/g | 19.9 | 3.0799 | 4.9975 |
| Mercury Intrusion Pore Volume Ratio (V2/V1)*100 | 81.0 | 56.6 | 39.7 |
| % $Na_2SO_4$ | 1.9 | 0.51 | 1.8 |
| APS MicroTrac microns for Powders | 14.2 | 268 | 45 |
| % Free Moisture | 5.7 | 5.5 | 5.0 |
| Projected Surface Area, nm² | 4211 | 9627 | 1967 |
| Linseed Oil Absorption, cm³/100 gram | 202 | 185 | 185 |
| DBP Oil Absorption, cm³/100 gram | 222 | 233 | 298 |

Each of the inventive silica products described in Table 1 and the prior art silica products described in Table 2 was then incorporated at various loadings into identical rubber matrices to compare the characteristics imparted by the silica products to rubber compounds. In addition, a rubber compound was prepared using carbon black filler (no silica filler/no coupling agent). The composition of the rubber matrix is described in Table 3, while the exact silica forms (powder or granulated) and loading levels are provided in Table 4. The resulting rubber compounds were evaluated in accordance with industry standards for Mooney Viscosity (ASTM D1646), Mmax (ASTM D2084), $t_{s2}$ (ASTM D2084), T90 (ASTM D2084), 100, 200 and 300% modulus (ASTM D412), Tensile at Break (ASTM D412), Elongation at Break (ASTM D412), Molded Groove Tear Strength (ASTM D624), DIN Abrasion Resistance (ISO-4649 Method B), NBS Abrasion Resistance Rating (ASTM D1630), Firestone Running Temperature (ASTM D623), Zwick Rebound at −25, 22 and 100° C. (ASTM 1504), and 1% and 12% DSA Tangent Delta at 60° C. (measured on an RPA 2000 by Monsanto). The results are summarized in Table 4.

TABLE 3

| Ingredient | Carbon Black N-234 Formula | Silica Formulas |
|---|---|---|
| Solution SBR-JSR-SL574* | 75 | 75 |
| Polybutadiene CB11** | 25 | 25 |
| Reinforcing Filler | 80 | 80 |
| Stearic Acid | 1 | 1 |
| Coupling Agent X-50S | 0 | 00.0–12.80 |
| Sundex 8125 | 32.5 | 32.5 |
| Zinc Oxide | 2.5 | 2.5 |
| Sunolite 240TG*** | 1.5 | 1.4 |
| Santoflex 13 | 2 | 2 |
| Sulfur | 1.35 | 1.7 |
| Delac S | 1.35 | 1.7 |
| DPG | 0 | 2 |
| Total phr | 222.2 | 224.80–237.60 |

*Japanese Synthetic Rubber Company
**Bayer Fibers, Organics & Rubber Division
***Sovereign Chemical Company

TABLE 4

| Rubber Physical and Performance Characteristics | Rubber with N-234 Carbon Black | Rubber with Comp. Ex. 1 Filler | Rubber with Comp. Ex. 2 Filler | Rubber with Comp. Ex. 2 Filler | Rubber with Comp. Ex. 3 Filler | Rubber with Comp. Ex. 3 Filler | Rubber with Ex. 1 Filler | Rubber with Ex. 1 Filler | Rubber with Ex. 3 Filler | Rubber with Ex. 5 Filler | Rubber with Ex. 6 Filler | Rubber with Ex. 7 Filler |
|---|---|---|---|---|---|---|---|---|---|---|---|---|
| Form of Silica Filler | *** | Powder | Micropearls | Micropearls | Powder | Powder | Powder | Powder | Powder | Granules | Powder | Granules |
| Coupling Agent (phr) | 0.00 | 7.20 | 12.80 | 8.96 | 12.80 | 8.96 | 12.8 | 7.20 | 10.0 | 7.00 | 7.0 | 7.0 |
| Mmax (Nm) | 6.5 | 7.9 | 9.0 | 8.5 | 8.0 | 7.6 | 8.9 | 7.3 | 8.1 | 6.9 | 8.0 | 9.6 |
| $t_{s2}$ (min) | 3.8 | 2.2 | 1.9 | 1.8 | 1.9 | 1.7 | 1.9 | 2.3 | 2.2 | 2.3 | 2.8 | 2.5 |
| T90 (min) | 7.3 | 3.8 | 9.3 | 13.0 | 6.4 | 9.3 | 5.5 | 4.7 | 6.8 | 4.0 | 5.5 | 5.6 |
| Mooney Viscosity $M_{L(1+4)}$ @ 100 C (mu) | 70.9 | 50.0 | 92.0 | 97.0 | 82.0 | 86.0 | 57.2 | 59.4 | 72.5 | 49.3 | 50.8 | 60.3 |
| 100% Modulus (MPa) | 2.01 | 2.74 | 2.90 | 2.53 | 2.85 | 2.30 | 3.94 | 2.45 | 2.94 | 2.64 | 2.63 | 2.87 |
| 200% | 4.31 | 6.98 | 7.03 | 6.17 | 8.24 | 6.34 | 10.7 | 6.50 | 7.10 | 7.36 | 6.13 | 6.95 |

TABLE 4-continued

| Rubber Physical and Performance Characteristics | Rubber with N-234 Carbon Black | Rubber with Comp. Ex. 1 Filler | Rubber with Comp. Ex. 2 Filler | Rubber with Comp. Ex. 2 Filler | Rubber with Comp. Ex. 3 Filler | Rubber with Comp. Ex. 3 Filler | Rubber with Ex. 1 Filler | Rubber with Ex. 1 Filler | Rubber with Ex. 3 Filler | Rubber with Ex. 5 Filler | Rubber with Ex. 6 Filler | Rubber with Ex. 7 Filler |
|---|---|---|---|---|---|---|---|---|---|---|---|---|
| Modulus (MPa) 300% | 8.07 | 12.7 | 14.4 | 12.0 | 13.2 | 13.1 | *** | 12.1 | 9.24 | 13.2 | 10.5 | 12 0 |
| Modulus (MPa) Tensile at Break (MPa) | 18.9 | 15.4 | 17.8 | 16.8 | 18.2 | 19.1 | 14.4 | 16.4 | 15.0 | 15.6 | 14.3 | 14.8 |
| % Elongation at Break | 618 | 341 | 346 | 371 | 367 | 386 | 251 | 372 | 344 | 344 | 384 | 346 |
| DIN Abrasion Resistance Index | *** | *** | 112 | 102 | 134 | 129 | *** | *** | *** | 127 | 136 | 123 |
| NBS Abrasion Resistance Rating (%) | 4190 | 4392 | 9500 | 11500 | 9060 | 11300 | 9928 | 11065 | 7041 | *** | *** | 8082 |
| Firestone Running Temperature, C | 150 | 94 | 104 | 107 | 99 | 102 | 97 | 94 | 100 | *** | *** | *** |
| Zwick Rebound @ 100 C (%) | 50 | 73 | 65 | 63 | 68 | 67 | 62 | 70 | 70 | 79 | 70 | 69 |
| Zwick Rebound @ 22 C (%) | 35 | 63 | 50 | 51 | 54 | 55 | 60 | 58 | 56 | 62 | 57 | 61 |
| Zwick Rebound @ −25 C (%) | 11.0 | 7.6 | 7.6 | 7.6 | 6.6 | 6.8 | 6.4 | 8.4 | 7.6 | 5.8 | 7.8 | 7 0 |
| Tan Delta 60 C 12% DSA | 0.353 | 0.087 | 0.155 | 0.139 | 0.110 | 0.110 | 0.101 | 0.102 | 0.118 | 0.100 | *** | *** |
| Tan Delta 60 C 1% DSA | 0.289 | 0.057 | 0.118 | 0.103 | 0.090 | 0.079 | 0.084 | 0.086 | 0.098 | 0.064 | *** | *** |

More silica products in accordance with the invention were prepared in accordance with Example 6 and utilizing the silicate specific gravity, excess silicate, reaction temperature, digestion temperature and spray dryer feed pH noted in Table 5. These inventive silica products were individually incorporated into a rubber formulation described in Table 6, as was a prior art silica product for comparative purposes (Zeopol® 8745, J.M. Huber Corporation). The resulting rubber formulations were tested in accordance with passenger tire industry standards (as described above in association with Table 4), and the results are summarized in Table 7.

TABLE 5

| Synthesis Parameters, Physical Characteristics | Example 8 | Example 9 | Example 10 | Example 11 | Example 12 | Example 13 | Example 14 | Example 15 |
|---|---|---|---|---|---|---|---|---|
| Form | Powder | Powder | Powder | Powder | Powder | Powder | Powder | Powder |
| Silicate Specific Gravity in Reaction Medium | 1.120 | 1.120 | 1.135 | 1.135 | 1.135 | 1.135 | 1.135 | 1.135 |
| Excess Silicate, % | 83.7 | 83.7 | 83.7 | 83.7 | 83.7 | 83.7 | 83.7 | 83.7 |
| Reaction Temperature, °C. | 80 | 80 | 80 | 80 | 68 | 68 | 68 | 68 |
| Digest Temperature, °C. | 80 | 80 | 80 | 80 | 68 | 68 | 93 | 93 |
| Spray Dryer Feed pH | 6.8 | 6.2 | 6.8 | 6.2 | 6.8 | 6.2 | 6.8 | 6.2 |
| Specific Surface Area by CTAB, m$^2$/g | 80 | 90 | 72 | 72 | 118 | 119 | 104 | 110 |
| Specific Surface Area by BET, m$^2$/g | 120 | 152 | 130 | 153 | 243 | 261 | 170 | 220 |
| 5% pH | 7.35 | 6.87 | 7.14 | 7.25 | 7.48 | 6.99 | 7.2 | 7.1 |
| Mercury Intrusion Peak Diameter Location, Å | 590 | 580 | 850 | 830 | 450 | 420 | 400 | 410 |
| Mercury Intrusion Total Pore Volume, cm$^3$/g | 4.7917 | 4.3743 | 4.4631 | 4.3070 | 4.4379 | 4.4070 | 4.5979 | 3.4736 |
| Mercury Intrusion Pore Volume Ratio (V2/V1)*100 | 24.2 | 22.2 | 24.9 | 21 | 32.6 | 32.9 | 30.7 | 31.9 |
| % Na$_2$SO$_4$ | 2.32 | 1.14 | 2.39 | 1.06 | 1.29 | 1.14 | 4.28 | 1.61 |
| APS MicroTrac, | 46.4 | 43.0 | 58.6 | 55.8 | 84.1 | 49.3 | 66.6 | 56.8 |

TABLE 5-continued

| Synthesis Parameters, Physical Characteristics | Example 8 | Example 9 | Example 10 | Example 11 | Example 12 | Example 13 | Example 14 | Example 15 |
|---|---|---|---|---|---|---|---|---|
| microns | | | | | | | | |
| % Free Moisture | 4.7 | 4.7 | 5.1 | 4.5 | 6.6 | 5.8 | 5.0 | 4.4 |
| Linseed Oil Absorption, cm$^3$/100 gram | 235 | 225 | 218 | 214 | 245 | 237 | 237 | 242 |
| DBP Oil Absorption, cm$^3$/100 gram | 251 | 268 | 231 | 241 | 279 | 272 | 256 | 255 |

TABLE 6

| Ingredient | Silica Formulas |
|---|---|
| Solution - SBR | 70.00 |
| Polybutadiene | 30.00 |
| Reinforcing Filler | 70.00 |
| Coupling Agent X-50S | 11.00 |
| Processing Aids | 33.50 |
| Sulfur | 1.70 |
| Cure Agents | 9.20 |
| Total phr | 225.10 | equal to or better than the rubber compounds containing the prior art silica products in every evaluated performance characteristic. The Tables also show that the inventive silica products compare very favorably to the previously used carbon black filler as reflected by the rubber performance characteristics. More specifically, the inventive silica products exhibited yielded rubber compound having all of the same advantages of rubber compounds filled with prior art silica products while increasing the benefits of abrasion resistance. The inventive silica products also enhanced the processability of the rubber compounds over the prior art highly-dispersible silica fillers to levels achieved with carbon black fillers. Moreover, the Tables show that the new

TABLE 7

| Performance Characteristic | Rubber with Zeopol® 8745 Filler | Rubber with Example 8 Filler | Rubber with Example 9 Filler | Rubber with Example 10 Filler | Rubber with Example 11 Filler | Rubber with Example 12 Filler | Rubber with Example 13 Filler | Rubber with Example 14 Filler | Rubber with Example 15 Filler |
|---|---|---|---|---|---|---|---|---|---|
| Form | Granule | Powder | Powder | Powder | Powder | Powder | Powder | Powder | Powder |
| Mmax (Nm) | 64.6 | 65.6 | 66.3 | 67.0 | 68.0 | 65.4 | 65.0 | 66.1 | 67.1 |
| $t_{s2}$ (min) | 5.0 | 4.0 | 4.2 | 3.8 | 3.8 | 4.8 | 4.4 | 4.6 | 4.9 |
| T90 (min) | 12.1 | 7.1 | 7.4 | 7.0 | 8.3 | 10.1 | 14.4 | 9.9 | 13.6 |
| Mooney Viscosity $M_{L(1+4)}$ @ 100 C (mu) | 81.0 | 81.7 | 84.2 | 81.0 | 81.7 | 84.8 | 91.3 | 88.7 | 92.9 |
| 100% Modulus (MPa) | 2.26 | 2.57 | 2.62 | 2.59 | 3.02 | 2.43 | 2.46 | 2.52 | 2.67 |
| 200% Modulus (MPa) | 6.67 | 6.94 | 7.33 | 6.99 | 7.80 | 6.33 | 6.73 | 6.92 | 7.75 |
| 300% Modulus (MPa) | 13.4 | 12.7 | 13.5 | 12.7 | 13.5 | 12.1 | 12.8 | 13.2 | 14.8 |
| Tensile at Break (MPa) | 21.7 | 18.9 | 19.2 | 16.8 | 17.0 | 19.3 | 19.5 | 19.6 | 18.3 |
| % Elongation at Break | 420 | 399 | 393 | 378 | 364 | 421 | 395 | 401 | 360 |
| Tear - Molded Groove (kN/m) | 46 | 25 | 27 | 25 | 25 | 47 | 47 | 36 | 31 |
| Tan Delta @ 60 C 12% DSA | 0.128 | 0.104 | 0.102 | 0.090 | 0.099 | 0.113 | 0.119 | 0.111 | 0.112 |
| Tan Delta @ 60 C 1% DSA | 0.078 | 0.066 | 0.062 | 0.061 | 0.065 | 0.074 | 0.078 | 0.073 | 0.073 |

Table 8 summarizes the relative performances of the silica products as reflected by the rubber characteristics listed in Tables 4 and 7. Tables 4, 7 and 8 reveal that the rubber compounds containing the inventive silica products perform silica products as rubber fillers have reduced coupling agent demand, lower heat build-up, and improved wet/ice traction over both carbon black and the prior art silica products.

TABLE 8

| Performance Characteristics | Preferred Values | Inventive Example Silica Products versus Carbon Black | Granulated Inventive Example Silica Products versus Comparative Example 1 | Inventive Example Silica Products versus Comparative Examples 2 and 3 |
|---|---|---|---|---|
| Form | Granules | Equal | Much Superior | Equal/Better |
| Coupling Agent (Si-69) loading | Lower/Cost | Poorer | Better | Much Superior |
| Mmax (Nm) | Greater | Poorer | Equal/Better | Equal |
| $t_{s2}$ (min) | Greater | Poorer | Equal | Better |
| T90 (min) | Lower | Better | Equal | Better |
| Mooney Viscosity $M_{L(1+4)}$ @ 100° C. (mu) | Lower/Processing | Better | Equal/Poorer | Much Superior |
| 100% Modulus (MPa) | Lower | Poorer | Equal | Equal |
| 200% Modulus (MPa) | Greater | Better | Equal | Equal |
| 300% Modulus (MPa) | Greater | Better | Equal | Equal/Better |
| Tensile at Break (MPa) | Greater | Poorer | Equal | Equal |
| % Elongation at Break | Greater | Poorer | Equal | Equal |
| NBS Abrasion Resistance Rating (%) | Greater | Much Superior | Much Superior | Equal |
| Firestone Running Temp (° C.) | Lower | Much Superior | Equal | Much Superior |
| Zwick Rebound @ 100° C. (%) | Greater | Much Superior | Equal | Equal |
| Zwick Rebound @ 22° C. (%) | Greater | Much Superior | Equal | Equal |
| Zwick Rebound @ −25° C. (%) | Lower | Much Superior | Equal/Better | Equal/Better |
| Tan Delta @ 60° C. 12% DSA | Lower | Much Superior | Equal | Much Superior |
| Tan Delta @ 60° C. 1% DSA | Lower | Much Superior | Equal | Much Superior |

The examples factually demonstrate that the invention provides unexpectedly improved processing and performance characteristics in rubber compounds for tire treads. In particular, the invention provides a highly-advantageous combination of performance characteristics to rubber tire tread formulations previously thought to be contradictory, such as reduced rolling resistance (evidenced by the low Firestone Running Temperature, high Zwick 100° C. rebound, and low Tan Delta at 60° C.), improved traction over a wide range of conditions (evidenced by the low Zwick rebound at −25° C.), and excellent abrasion resistance (evidenced by the NBS abrasion resistance values).

Rubber mixing and extrusion advantages provided by the invention are evidenced by the low Mooney viscosity values seen above. Further, the low T90 (associated with increased production rates) and high $t_{s2}$ (scorch) values demonstrates that processing improvements are obtained with the invention without premature setting of the composition.

While the invention has been described herein with reference to specific and preferred embodiments, it is understood that changes, modifications, substitutions and omissions may be made without departing from the spirit and scope of the invention defined in the appended claims.

We claim:

1. A precipitated amorphous silica product comprising:
   a CTAB specific surface area of about 10 m²/g to less than 140 m²/g;
   a multi-point BET surface area of about 50–261 m²/g;
   a 5% pH value of about 5.0–8.5;
   a DBP oil absorption of about 160–310 cm³/100 g;
   a linseed oil absorption of about 150–300 cm³/100 g;
   a projected surface area of no greater than about 4000 nm²; and
   a pore volume ratio of pores ranging from 175 to 275 Å in diameter to all pores less than 400 Å in diameter of about 10% to less than 50%.

2. The precipitated amorphous silica product according to claim 1, wherein said CTAB specific surface area is about 10–110 m²/g.

3. The precipitated amorphous silica product according to claim 1, wherein said CTAB specific surface area is about 10 m²/g to less than 100 m²/g.

4. The precipitated amorphous silica product according to claim 3, wherein said projected surface area is no greater than 3500 nm².

5. A formed precipitated amorphous silica product comprising:
   a CTAB specific surface area of about 10 m²/g to less than 140 m²/g;
   a multi-point BET surface area of about 50–261 m²/g;
   a 5% pH value of about 5.0–8.5;
   a DBP oil absorption of about 160–310 cm³/100 g;
   a linseed oil absorption of about 150–300 cm³/100 g;
   a projected surface area of no greater than about 4000 nm²; and
   a pore volume ratio of pores ranging from 175 to 275 Å in diameter to all pores less than 400 Å in diameter of about 10% to less than 50%.

6. The formed precipitated amorphous silica product according to claim 5, wherein said CTAB specific surface area is about 10–110 m²/g.

7. The formed precipitated amorphous silica product according to claim 5, wherein said CTAB specific surface area is about 10 m²/g to less than 100 m²/g.

8. The formed precipitated amorphous silica product according to claim 5, further comprising a bulk density of about 0.16–0.30 g/mL.

9. The formed precipitated amorphous silica product according to claim 5, further comprising a bulk density of about 0.16–0.27 g/mL.

10. The formed precipitated amorphous silica product according to claim 5, further comprising a minus 200 mesh content of no greater than about 20 wt %.

11. The formed precipitated amorphous silica product according to claim 10, wherein said minus 200 mesh content is no greater than about 10 wt %.

12. A method of producing a precipitated amorphous silica product, comprising the steps of:
  (a) adding an acid to a mixture of water and an alkaline metal silicate at a substantially constant rate until a reaction mixture having a pH of about 10.0–6.5 is formed, said mixture being at a temperature of about 60–90° C., and said silicate having a mole ratio of about 2.4–3.3;
  (b) adding more of said silicate to said reaction mixture for about 0–60 minutes while simultaneously controlling said rate of acid addition to maintain said reaction mixture pH at about 10.0–6.5;
  (c) discontinuing said silicate addition and continuing said acid addition until a reaction mixture pH to about 4.5–6.5 is achieved;
  (d) digesting said reaction mixture for about 0–60 minutes at a temperature of about 60–99° C.;
  (e) filtering said reaction mixture to recover a silica slurry;
  (f) washing said silica slurry to form a washed silica product; and
  (g) drying said washed silica product to form a dried silica product.

13. The method according to claim 12, wherein said washing step is performed until said washed silica product has a sodium sulfate content of no greater than about 4.5%.

14. The method according to claim 12, further comprising the step of adjusting the pH of said washed silica product to about 6.0–7.0.

15. The method according to claim 12, wherein said drying step is performed until said dried silica product has an $H_2O$ content of no greater than about 8%.

16. The method according to claim 12, wherein an electrolyte is added during at least one of said steps selected from the group consisting of adding an acid to a mixture of water and an alkaline metal silicate, adding more of said silicate to said reaction mixture, discontinuing said silicate addition and continuing said acid addition, and digesting said reaction mixture.

17. The method according to claim 16, wherein said electrolyte is sodium sulfate.

18. An elastomeric compound comprising an elastomer and a precipitated amorphous silica product, said silica product comprising:
  a CTAB specific surface area of about 10 $m^2/g$ to less than 140 $m^2/g$;
  a multi-point BET surface area of about 50–261 $m^2/g$;
  a 5% pH value of about 5.0–8.5;
  a DBP oil absorption of about 160–310 $cm^3/100$ g;
  a linseed oil absorption of about 150–300 $cm^3/100$ g;
  a projected surface area of no greater than about 4000 $nm^2$; and
  a pore volume ratio of pores ranging from 175 to 275 Å in diameter to all pores less than 400 Å in diameter of about 10% to less than 50%.

19. The elastomeric compound according to claim 18, wherein said CTAB specific surface area of said silica product is about 10–110 $m^2/g$.

20. The elastomeric compound according to claim 18, wherein said CTAB specific surface area of said silica product is about 10 $m^2/g$ to less than 100 $m^2/g$.

21. The elastomeric compound according to claim 18, wherein said precipitated amorphous silica product is a formed silica product.

22. The elastomeric compound according to claim 21, wherein said formed silica product has a bulk density of about 0.16–0.30 g/mL.

23. The elastomeric compound according to claim 21, wherein said formed silica product has a bulk density of about 0.16–0.27 g/mL.

24. The elastomeric compound according to claim 21, wherein said formed silica product has a minus 200 mesh content of no greater than 20 wt %.

25. The elastomeric compound according to claim 18, wherein said elastomer is a solution styrene-butadiene rubber.

26. The elastomeric compound according to claim 25, wherein said elastomer further comprises at least one other polymer.

27. The elastomeric compound according to claim 26, wherein said other polymer is a diene.

28. A passenger tire tread comprising an elastomer and a precipitated amorphous silica product, said silica product comprising:
  a CTAB specific surface area of about 10 $m^2/g$ to less than 140 $m^2/g$;
  a multi-point BET surface area of about 50–261 $m^2/g$;
  a 5% pH value of about 5.0–8.5;
  a DBP oil absorption of about 160–310 $cm^3/100$ g;
  a linseed oil absorption of about 150–300 $cm^3/100$ g;
  a projected surface area of no greater than about 4000 $nm^2$; and
  a pore volume ratio of pores ranging from 175 to 275 Å in diameter to all pores less than 400 Å in diameter of about 10% to less than 50%.

29. The passenger tire tread according to claim 28, wherein said CTAB specific surface area of said silica product is about 10–110 $m^2/g$.

30. The passenger tire tread according to claim 28, wherein said CTAB specific surface area of said silica product is about 10 $m^2/g$ to less than 100 $m^2/g$.

31. The passenger tire tread according to claim 28, wherein said silica product is a formed silica product.

32. The passenger tire tread according to claim 31, wherein said formed silica product has a bulk density of about 0.16–0.30 g/mL.

33. The passenger tire tread according to claim 31, wherein said formed silica product has a bulk density of about 0.16–0.27 g/mL.

34. The passenger tire tread according to claim 31, wherein said formed silica product has a minus 200 mesh content of no greater than about 20 wt %.

35. The passenger tire tread according to claim 28, wherein said elastomer is a solution styrene-butadiene rubber.

36. The passenger tire tread according to claim 35, wherein said elastomer further comprises at least one other polymer.

37. The passenger tire tread according to claim 36, wherein said other polymer is a diene.

* * * * *

UNITED STATES PATENT AND TRADEMARK OFFICE
CERTIFICATE OF CORRECTION

PATENT NO. : 5,929,156

DATED : 7/27/99

INVENTOR(S) : Fultz et al.

It is certified that error appears in the above-identified patent and that said Letters Patent is hereby corrected as shown below:

In Columns 11 and 12, TABLE 4, Last Column,
  Row 2, delete "9 6", and insert -- 9.6 -- therefor,
  Row 3, delete "2 5", and insert -- 2.5 -- therefor,
  Row 4, delete "5 6", and insert -- 5.6 -- therefor.

In Columns 13 and 14, TABLE 4, Last Column,
  Row 1, delete "12 0", and insert -- 12.0 -- therefor,
  Row 9, delete "7 0", and insert -- 7.0 -- therefor.

Signed and Sealed this

Eighteenth Day of January, 2000

*Attest:*

Q. TODD DICKINSON

*Attesting Officer*    Commissioner of Patents and Trademarks